(12) United States Patent
Frédéric et al.

(10) Patent No.: US 12,084,780 B2
(45) Date of Patent: Sep. 10, 2024

(54) METHOD FOR REMOVING ROUGING FROM STAINLESS STEEL

(71) Applicant: TECHNOCHIM SA, Ghislenghien (BE)

(72) Inventors: Groulard Frédéric, Cambron-Saint-Vincent (BE); François Tosar, Gosselies (BE); Juliette Louche, Mons (BE)

(73) Assignee: TECHNOCHIM SA, Ghislenghien (BE)

( * ) Notice: Subject to any disclaimer, the term of this patent is extended or adjusted under 35 U.S.C. 154(b) by 795 days.

(21) Appl. No.: 16/147,918

(22) Filed: Oct. 1, 2018

(65) Prior Publication Data
US 2020/0024751 A1   Jan. 23, 2020

(30) Foreign Application Priority Data
Jul. 23, 2018 (EP) .................... 18184977

(51) Int. Cl.
| | | |
|---|---|---|
| C23G 1/08 | (2006.01) | |
| B08B 3/08 | (2006.01) | |
| B08B 3/10 | (2006.01) | |
| B08B 17/00 | (2006.01) | |
| C09K 13/00 | (2006.01) | |
| C09K 13/02 | (2006.01) | |
| C09K 13/12 | (2006.01) | |
| C23F 3/06 | (2006.01) | |

(52) U.S. Cl.
CPC .............. *C23F 3/06* (2013.01); *B08B 3/08* (2013.01); *B08B 3/10* (2013.01); *B08B 17/00* (2013.01); *C09K 13/00* (2013.01); *C09K 13/02* (2013.01); *C09K 13/12* (2013.01); *C23G 1/08* (2013.01); *B08B 2203/007* (2013.01)

(58) Field of Classification Search
None
See application file for complete search history.

(56) References Cited

U.S. PATENT DOCUMENTS

| | | | |
|---|---|---|---|
| 4,481,040 A | 11/1984 | Brookes et al. | |
| 2010/0078040 A1* | 4/2010 | Vernier | C23F 14/02 134/3 |

(Continued)

FOREIGN PATENT DOCUMENTS

| | | |
|---|---|---|
| DE | 10 2015 114481 A1 | 3/2017 |
| EP | 0 071 336 A1 | 2/1983 |

(Continued)

OTHER PUBLICATIONS

Communication European Search Report dated Dec. 18, 2018 in connection with European Patent Application No. 18184977.9.

*Primary Examiner* — Mikhail Kornakov
*Assistant Examiner* — Ryan L Coleman
(74) *Attorney, Agent, or Firm* — Amster, Rothstein & Ebenstein LLP

(57) ABSTRACT

The present invention is in the field of chemical cleaning and surface treatments for a stainless steel substrate. In particular, the present invention provides a method, kit and use of specific solutions for removing and preferably preventing the formation of rouging (e.g. class I, II and/or III) on a stainless steel substrate, which may be used as processing station or production unit.

24 Claims, 2 Drawing Sheets

(56) References Cited

U.S. PATENT DOCUMENTS

2013/0303420 A1\* 11/2013 Cooper .................. C11D 3/26
                                                                        510/175
2017/0342570 A1    11/2017 Groulard et al.
2018/0245022 A1\*  8/2018 Stokes .................. C11D 3/044

FOREIGN PATENT DOCUMENTS

| EP | 1721961 | \* | 11/2006 |
| EP | 3 249 076 A1 | | 11/2017 |
| WO | 2009/095475 A1 | | 8/2009 |

\* cited by examiner

METHOD FOR REMOVING ROUGING FROM STAINLESS STEEL

CROSS-REFERENCE TO RELATED APPLICATION

This application claims priority to European Patent Application No. 18184977.9, filed Jul. 23, 2018, the contents of which are herein incorporated by reference in their entirety.

TECHNICAL FIELD

The present invention is in the field of chemical cleaning and surface treatments for a stainless steel substrate. In particular, the present invention provides a method, kit and use of specific solutions for removing and preferably preventing the formation of rouging (e.g. class I, II and/or III) on a stainless steel substrate, which may be used as processing station or production unit.

BACKGROUND

Various industries such as the pharmaceutical, food and biotechnological industries use systems and units (e.g. mixing vats, storage containers, vessels, water or vapour generators, filling machines, and so on) for the production and processing of their products. These systems and units typically consist of stainless steel substrates produced from stainless steel alloys, such as chromium/nickel/molybdenum steels. Despite the use of high quality materials after a while discolorations appear on the stainless steel substrate's surface which come in contact with products and processing media (e.g. water or other solutions). These discolorations are a form of corrosion and typically the result of films or deposits on the stainless steel surfaces, such as Fe oxides particles or Cr, Ni and Mo components.

At an early stage the discolorations show a fine reddish colour and are thus referred to as "rouging". Class I rouging typically originates from external sources such as erosion or cavitation, whereas class II rouging can be explained as a breakdown of the passive layer inducing a corrosion of the stainless steel surfaces. It could be enhance by chloride. However, in some cases a more intense form of rouging will show a dark blue to black colour instead, and may be referred to as "blacking". The latter class III rouging is typically found in high temperature steam systems.

Although the exact cause of rouging is not yet entirely understood, it is believed that the colour variation is a result of the oxide/hydroxide/carbonate type and variations in the water of hydration associated with the corrosion products. Consequently, the rouging is closely linked to and dependent on the materials used and the thermodynamic conditions to which these materials are exposed. Depending on the operating intensity and conditions, these surface changes can occur as early as a few months after a unit is first started up. In other cases, it may be years until the rouging is first observed.

For example, it is frequently observed in the pharmaceutical industry that stainless steel surfaces tend to develop a red to black thick surface layer upon contact with hot (above 50° C.) water (vapour or liquid) having an electrolytic conductivity less than 1 $\mu S/cm^2$. For instance, the surfaces of Water-For-Injection equipment inspected after 6 to 18 months often show the so-called rouging effects, i.e. the presence of an increased concentration of iron oxide on the surface. Apart from iron oxide, mixed metal oxides are also present such as iron-chrome-nickel mixed metal oxides.

Rouging presents a danger in the industry since it leads to the release of heavy metal oxide particles from the stainless steel surface. This may result in undesired contamination of products (e.g. pharmaceuticals) with heavy metal particles, and thereby negatively affect the purity and quality of products and their processing. Furthermore, rouging increases the micro-roughness of affected stainless steel surfaces and reduces the efficiency of the used systems and units. As a result thereof, the rouging has to be removed periodically to ensure high quality and purity of products.

There exist various methods and machines to remove rouging. However, mechanical cleaning processes (e.g. by wiping with a cloth) are limited to easily accessible areas and loosely adhering particles. Such processes are thus not suitable to remove more permanent discolorations at harder to reach areas, as well adhering films and deposits. For this purpose, wet-chemical cleaning processes are used almost exclusively. For example, WO 2009/095,475 and U.S. Pat. No. 8,192,550 describe the use of cleaning solutions and methods for removing rouging from stainless steel surfaces. Additionally, treatments that delay or reduce the formation of rouging may also be applied. For example, EP 3 249 076 describes products for the preventive treatment of stainless steel and related methods.

However, the presently available products and methods are still found lacking when aiming to completely remove rouging, or require the use of strong and highly concentrated mineral acids despite the numerous known disadvantages for the systems. In particular intense class II and class III rouging are known to be particularly difficult to completely remove, requiring the use of extremely costly, laborious and often difficult to perform treatments.

For instance, when handled improperly, the use of concentrated acids can lead to considerable danger, both with respect to its transport and disposal. In addition the acids do not specifically target the rouging, but also partly dissolve the heavy metals additionally present in the alloy of the stainless steel. Thus, when handled improperly, there is the danger that the surface of the process stations and production units is attacked and the surface properties are negatively affected. Moreover, their use as a component of the cleaning solution itself is also dangerous for the handlers as its vapours can cause severe respiratory irritations.

In view of the above there is a need for novel methods and products to more efficiently and completely remove rouging deposits, in particular class II and/or class III rouging. Preferably these methods and products also provide a preventative treatment to prevent or at least delay the formation of rouging.

SUMMARY

The invention according to the present disclosure solves the aforementioned problems. Accordingly, provided herein are a method, kit and use of specific solutions for removing and preferably also preventing the formation of any class of rouging (e.g. class I, class II and/or class III) on a stainless steel substrate, which may be used as processing station or production unit. The method, kit and use may be particularly effective for removing class II rouging, The method, kit and use may be particularly effective for removing class III rouging, which is typically the most difficult to remove rouging class.

It is an aspect of the invention to provide a method for removing and/or preventing rouge formation on stainless steel, the method comprising the steps of separately contacting a stainless steel substrate with each of the following solutions:
- an alkaline oxidizing solution comprising permanganate and/or bromate compound, or any of the corresponding salts as an oxidizing agent;
- a neutral or alkaline reducing solution comprising dithionite, sulphite, bisulphite, disulfite, any of the corresponding salts and/or a combination thereof as a reducing agent; and,
- an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$. In some preferred embodiments, the method is for removing and/or preventing class I, class II and/or class III rouge formation on a stainless steel substrate.

In a further embodiment the method comprises the steps of successively contacting a stainless steel substrate with the following solutions:
(i) first, an alkaline oxidizing solution comprising a permanganate and/or bromate compound or any of the corresponding salts as an oxidizing agent;
(ii) second, a neutral or alkaline reducing solution comprising dithionite, sulphite, bisulphite, disulfite or any of the corresponding salts and/or a combination thereof as a reducing agent; and,
(iii) third, an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$. In some preferred embodiments the method is for removing and/or preventing class III rouge formation on a stainless steel substrate.

In an alternative embodiment the method comprises the steps of successively contacting a stainless steel substrate with the following solutions:
(i) first, an alkaline oxidizing solution comprising a permanganate and/or bromate compound or any of the corresponding salts as an oxidizing agent;
(ii) second, an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$; and,
(iii) third, a neutral or alkaline reducing solution comprising dithionite, sulphite, bisulphite, disulfite or any of the corresponding salts and/or a combination thereof as a reducing agent. In some preferred embodiments the method is for removing and/or preventing class II rouge formation on a stainless steel substrate.

It is another aspect of the invention to provide a kit for removing and/or preventing rouge formation on stainless steel, the kit comprising:
- an alkaline oxidizing solution comprising a permanganate and/or bromate compound or any of the corresponding salts as an oxidizing agent;
- a neutral or alkaline reducing solution comprising dithionite, sulphite, bisulphite, disulfite or any of the corresponding salts and/or a combination thereof as a reducing agent; and,
- an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$.

In some preferred embodiments, the kit is for removing and/or preventing class I, class II and/or class III rouge formation on a stainless steel substrate.

It is another aspect of the invention to provide a use of at least three solutions for removing and/or preventing rouge formation on stainless steel, the use comprising:
- an alkaline oxidizing solution comprising a permanganate and/or bromate compound or any of the corresponding salts as an oxidizing agent;
- a neutral or alkaline reducing solution comprising dithionite, sulphite, bisulphite, disulfite or any of the corresponding salts and/or a combination thereof as a reducing agent; and,
- an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$.

In some preferred embodiments, the use is for removing and/or preventing class I, class II and/or class III rouge formation on a stainless steel substrate.

In some embodiments the alkaline oxidizing solution is the first solution to contact the stainless steel substrate.

In some embodiments the oxidizing agent(s) in the alkaline oxidizing solution is selected from $KMnO_4$, $NH_4MnO_4$, $Ca(MnO_4)_2$, $NaMnO_4$, $AgMnO_4$, $KBrO_3$; and/or a combination thereof; preferably $KMnO_4$.

In some embodiments the oxidizing agent(s) in the alkaline oxidizing solution is present in a concentration of at least 0.1 g/l to at most 100.0 g/l, preferably 0.1 to 64.0 g/l, more preferably 1.0 to 45.0 g/l, most preferably 5.0 g/l to 20.0 g/l.

In some embodiments wherein the alkaline oxidizing solution has a pH of 7.5 to 14.0, preferably 10.0 to 14.0, more preferably 11.0 to 14.0, most preferably 12.0 to 14.0.

In some embodiments the alkaline oxidizing solution comprises NaOH and/or KOH as a base present in a concentration of at least 1.0 g/l to at most 750.0 g/l, preferably 10.0 g/l to 750.0 g/l, more preferably 25.0 g/l to 500.0 g/l, most preferably 75.0 g/l to at most 400.0 g/l.

In some embodiments the alkaline oxidizing solution has a temperature of 80° to 120° C. during contacting with the steel substrate, preferably from 85° to 110° C., more preferably from 90° to 100° C., and most preferably from 90° to 95° C.

In some embodiments the contacting time of the alkaline oxidizing solution with the stainless steel substrate is from 0.5 to 5.0 hours, preferably from 1.0 to 4.0 hours, more preferably from 1.0 to 3.0 hours, most preferably from 1.5 to 2.5 hours or about 2.0 hours.

In some embodiments the neutral or alkaline reducing solution comprises the reducing agent in a concentration ranging from at least 1.0 g/l to at most 100.0 g/l; preferably 5.0 to 75.0 g/l; more preferably 7.5 g/l to 60.0 g/l, most preferably 10.0 g/l to 50.0 g/l.

In some embodiments the neutral or alkaline reducing solution is an alkaline solution having a pH of 7.5 to 14.0, preferably 10.0 to 14.0, more preferably 11.0 to 14.0, most preferably 12.0 to 14.0.

In some embodiments the alkaline reducing solution comprises NaOH and/or KOH as base in a concentration of at least 1.0 g/l to at most 750.0 g/l, preferably 10.0 g/l to 750.0 g/l, more preferably 25.0 g/l to 500.0 g/l, most preferably 75.0 g/l to at most 400.0 g/l.

In some embodiments the neutral or alkaline reducing solution has a temperature of 80° to 120° C. during contacting with the steel substrate, preferably from 85° to 110° C., more preferably from 90° to 100° C., and most preferably from 90° to 95° C.

In some embodiments the contacting time of the neutral or alkaline reducing solution with the stainless steel substrate is from 0.5 to 5.0 hours, preferably from 1.0 to 4.0 hours, more preferably from 2.0 to 4.0 hours, most preferably from 2.5 to 3.5 hours or about 3.0 hours.

In some embodiments the complexing anions in the acidic reducing solution are anions corresponding to the conjugate bases of organic poly-carboxilic acids; preferably selected from dicarboxylic acids and tricarboxylic acids.

In some embodiments the poly-carboxilic acids are one or more of the following: oxalic acid, citric acid, tartaric acid, maleic acid, fumaric acid, adipic acid, succinic acid, and mixtures thereof; preferably oxalic acid.

In some embodiments the acidic reducing solution comprises the one or more complexing anions in a concentration from $1.0 \times 10^{-2}$ to $5 \times 10^{-2}$ mol/l, most preferably about $2.0 \times 10^{-2}$ mol/l.

In some embodiments the acidic reducing solution comprises the $Fe^{2+}$ in a concentration from $1.35 \times 10^{-5}$ to $9.0 \times 10^{-5}$ mol/l, preferably about $5.0 \times 10^{-5}$ mol/l.

In some embodiments the acidic reducing solution has a pH from 1.0 to 5.0, preferably from 1.0 to 4.0, more preferably from 2.0 to 4.0, most preferably from 2.5 to 3.5.

In some embodiments the acidic reducing solution comprises one or more pH modifiers; preferably one or more acids; most preferably $NH_3$ and/or $NH_4OH$.

In some embodiments the acidic reducing solution has a temperature of 50° to 100° C. during contacting with the steel substrate, preferably of 60 to 90° C., more preferably of 70 to 90° C., and most preferably from 80 to 90° C.;

In some embodiments the contacting time of the acidic reducing solution with the stainless steel substrate is from 0.50 hours to 8 hours, preferably from 0.50 hour to 4 hours, more preferably from 0.50 hours to 2 hours, most preferably from 0.75 hours to 1.5 hours.

DESCRIPTION OF THE FIGURES

The following description of the figures of specific embodiments of the invention is only given by way of example and is not intended to limit the present explanation, its application or use. In the drawings, identical reference numerals refer to the same or similar parts and features.

FIG. 1. (A) The first stainless steel substrate shows a significant class III rouging deposit. (B) The second stainless steel substrate shows a slightly reduced class III rouging deposit resulting from a suboptimal treatment. (C) The third stainless steel substrate shows a complete removal of class III rouging resulting from a treatment performed according to the method as described herein by successive contacting with three solutions, namely, (i) firstly with an alkaline oxidizing solution comprising potassium permanganate, (ii) secondly with an alkaline reducing solution comprising dithionite, and (iii) thirdly with an acidic reducing solution comprising complexing anions and Fe2+. The experimental details are discussed further in Example 1.

DESCRIPTION OF THE INVENTION

Figures 1A, 1B, 1C:
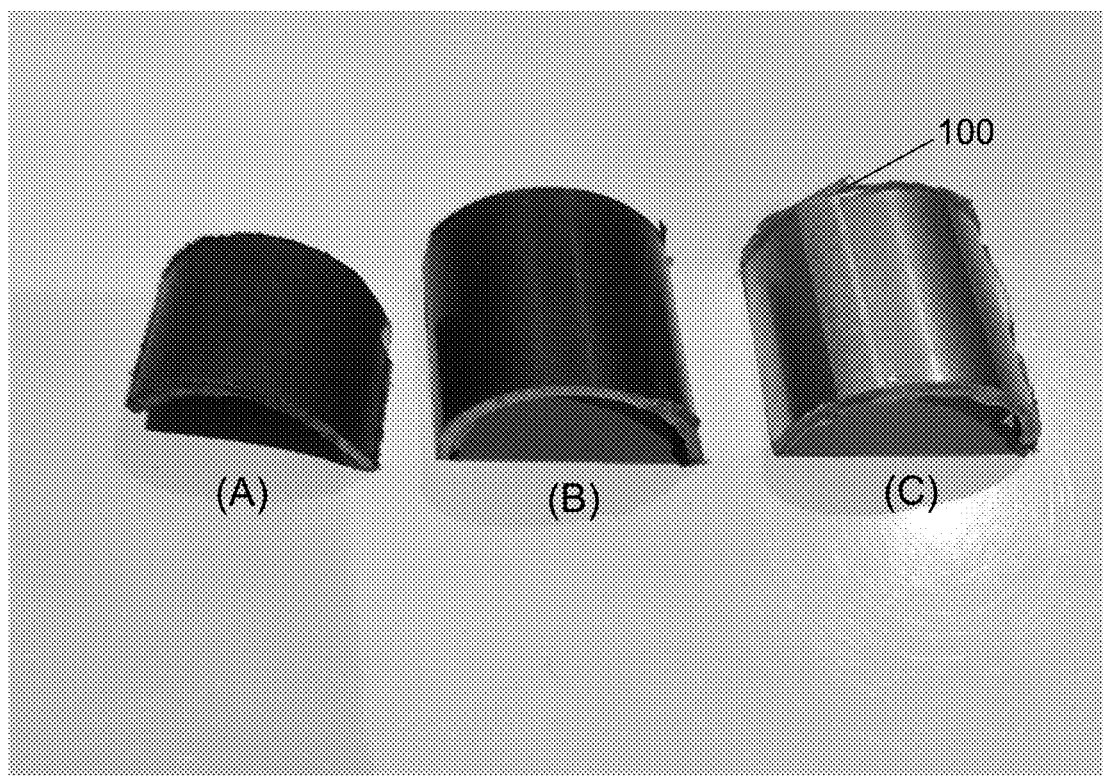
FIG. 1A-1C shows three (A, B, C) exemplary cut-out stainless steel substrates (100) before and after treatment with the present invention.

As used below in this text, the singular forms "a", "an", "the" include both the singular and the plural, unless the context clearly indicates otherwise.

The terms "comprise", "comprises" as used below are synonymous with "including", "include" or "contain", "contains" and are inclusive or open and do not exclude additional unmentioned parts, elements or method steps. Where this description refers to a product or process which "comprises" specific features, parts or steps, this refers to the possibility that other features, parts or steps may also be present, but may also refer to embodiments which only contain the listed features, parts or steps. The enumeration of numeric values by means of ranges of figures comprises all values and fractions in these ranges, as well as the cited end points.

The term "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the invention disclosed herein. It should be understood that the value to which the term "approximately" refers per se has also been disclosed.

All references cited in this description are hereby deemed to be incorporated in their entirety by way of reference.

Unless defined otherwise, all terms disclosed in the invention, including technical and scientific terms, have the meaning which a person skilled in the art usually gives them. For further guidance, definitions are included to further explain terms which are used in the description of the invention.

The present invention provides a method, kit and use of at least three solutions for removing and/or preventing the formation of rouging (e.g. class I, II and/or III) on a stainless steel substrate which is for example used as processing station or production unit. The present invention is based on the surprising observation that a combined use of at least three different solutions may result in a complete removal of any rouging deposit (e.g. class I, II and/or III), or at the very least a considerably improved removal when compared to state or art products and methods. Further, after removal any subsequent formation of rouging deposits may be prevented or at the very least considerably delayed. The present invention is particularly suitable for treatment of class II rouging, which is typically difficult to remove without damaging the substrate. The present invention is also particularly suitable for treatment of class III rouging, which is typically very difficult and cumbersome to remove without leaving rouging traces. Moreover, the present invention has the advantage that the removal and/or preventative treatment can be executed in the presence of atmospheric oxygen (i.e. no vacuum) and/or at normal operating conditions (e.g. pressure) without the need for disassembly of the device or apparatus having a stainless steel substrate affected by rouging.

The terms "rouging" or "rouge", and "rouging film", "rouging formation" or "rouging deposit" are used interchangeably herein and generally refer to a special form of deposits that occur on stainless steel surfaces, in particular on surfaces made from austenitic stainless steel substrates in hot systems or in ultrapure vapor systems, which typically comprise iron oxide- or iron hydroxide-dominated layers which typically comprise intercalated Cr, Ni and Mo or their oxides. These porous and particle-forming rouging layers rich in iron oxide, usually have a layer thickness between 0.1 μm and 10 μm and whose nature is that of a flat corrosion, replace the originally present dense and strong passive layers rich in chromium oxide. The class III rouging may also be referred to as "blacking" or "black film". Common thickness for rouging is between 200 nm and 1000 nm, although some substrates may have rouging layers of 2500 nm or greater.

As used herein the term "substrate" referred to in the different aspects of the present invention is a stainless steel substrate. For instance, it is a CrNi or a CrNiMo steel. Examples of CrNi and CrNiMo steels are steels of grades AISI 304 (1.4301), AISI 304L (1.4307, 1.4306), AISI 316 (1.4401), AISI 316L (1.4404, 1.4435), AISI316Ti (1.4571), or AISI 904L (1.4539) [according to DIN 10027-2]. Examples of stainless steel substrates that can be treated according to aspects of the present invention are mixing vats, storage containers, fermenters, recipient vessels, dryers, filling machines, sterilization vessels, freeze dryers, autoclaves, washing machines, ultrapure water generators, ultrapure vapour generators, distribution lines for purified or ultrapure fluids, and others.

As used herein the term "metal oxide" refers to iron (II) and/or iron (III) oxides and/or hydroxides, rouge (such as class I rouge, class II rouge, or class III rouge), and/or spinels such as iron (II-III) oxides wherein optionally part of the iron atoms are replaced by chromium, nickel, molybdenum and/or silicon atoms.

As used herein the term "solution" refers in the broadest sense of the word to a liquid mixture in which the component or components as listed are uniformly distributed within a solvent (e.g. water).

As used herein the term "pH" refers a scale of acidity ranging from 0 to 14. In particular, a neutral solution may be understood to have a pH of about 7 (for example 6.9, 7.0 or 7.1), an acidic solutions has a pH below 7 (for example 6.5, 6.0, 5.0, 4.0, etc.) and an alkaline solutions has a pH above 7 (for example 7.5, 8.0, 9.0, 10.0, etc.). The indicative pH values and pH ranges listed in any one embodiment of any of the solutions (e.g. first, second and third) correspond with the pH value prior to contact with a (stainless steel) substrate. It is understood that chemical reactions with rouging deposit and/or any residues or compounds present on the substrate may result in a shifting of the pH during contacting, thereby potentially lowering or increasing the pH value of the solution.

It is an aspect of the present invention to provide a method for removing and/or preventing rouge formation on stainless steel, the method comprising the steps of contacting a stainless steel substrate with the following solutions:
  an alkaline oxidizing solution comprising a permanganate and/or bromate compound or any of the corresponding salts;
  a neutral or alkaline reducing solution comprising a reducing agent selected from dithionite, sulphite, bisulphite, disulfite or any of the corresponding salts and/or a combination thereof; and,
  an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$.

Generally speaking, the method provides for a treatment of a stainless steel substrate affected by rouging, which is typically deposited on the surface of said stainless steel substrate. The rouging may be any of class I, class II or class III rouging, or a combination thereof, such as class I and class II rouging. By separately applying each of the three listed solutions rouging could be removed with an efficiency going beyond the observed removal effect of any one or even two of the three listed solutions. Accordingly, a synergistic effect could be identified achieving a unique functionality going beyond the expected effects for each of the listed solutions. Indeed, the present method may provide a complete rouging removal or at the very least a significantly improved removal of rouging when compared to state of art methods and products. Moreover, the treatment may provide a re-passivation of the selectively destroyed passive layer, thereby preventing or at least significantly delaying the formation of rouging after the treatment. Additionally, the method may result in reduced treatment cost and time, while also being more user-friendly and less dangerous. The improved rouging removal may in turn increase the operational lifetime and/or reduce the required downtimes of the systems and devices affected by rouging, and may in turn also improve the quality of products produced using said system and devices. The present method may thus be considered suitable for removing rouging with very high efficiency, i.e. removing (substantially) all traces of rouging deposits; less than 10% of rouging deposits left, preferably less than 5%; more preferably less than 3%; most preferably less than 1%. Additionally, sometimes steel substrates are simultaneously affected by different rouging types or layers of different rouging deposits, for example class I and class II, or class II and class III. Such mixed deposits may require supplementary or combined treatments, for instance by using two or more state of art methods in sequence. However, application of the method as described may result in simultaneous removal of different rouging types without the need for separate devices, products or methods for each rouging type.

The solutions are brought into contact with the rouging deposit on the steel substrate. In some embodiments the contacting is performed by dipping, flushing, or spraying. Preferably the stain steel substrate is completely covered by the solution. This may allow for complete removal of rouging in difficult to reach areas, such as in the vicinity of corners or apertures. The dipping, flushing, or spraying may be performed with additional tools, such a spray can or similar tools.

In some embodiments a solution is drained after contacting, i.e. between contacting with a following solution, which may prevent mixing with the subsequent solutions; preferably each solution is drained between each contacting step. In some embodiments the stainless steel substrate is rinsed with a rinsing fluid between each contacting step. Preferably the rinsing fluid is an aqueous rinsing fluid having an electrolytic conductivity of at most 1 μS/cm². Preferably, the rinsing fluid is drained prior to the next contacting step. Optionally the steel substrate may be rinsed prior to performing the method, for instance to remove any remaining dirt, dust or various chemical products present on said substrate.

In some preferred embodiments the method comprises the steps of successively contacting a stainless steel substrate with the following solutions:
  (i) first, an alkaline oxidizing solution comprising a permanganate and/or bromate compound or any of the corresponding salts;
  (ii) second, an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$; and,
  (iii) third, a neutral or alkaline reducing solution comprising a reducing agent selected from dithionite, sulphite, bisulphite, disulfite or any of the corresponding salts and/or a combination thereof.

By successively applying the three listed solutions in the order as indicated above, it was observed that class II rouging could be removed with an efficiency that goes beyond the application of any one or two of the three solutions separately or with a different ordering. In some preferred embodiments the method is for removing and/or preventing class II rouge formation on a stainless steel substrate.

Removing class II rouging is typically a very difficult and costly process requiring one or more corrosive substances As a result, using state of art methods there is a high risk of damaging the substrate surface state during cleaning. Moreover, various methods chemically transform the iron oxide layer but do not effectively remove it. However, application of the method as described herein and in particular according to the preferred embodiment may result in complete removal of class II rouging without damaging the steel substrate.

In some preferred embodiments the method comprises the steps of successively contacting a stainless steel substrate with the following solutions:
  (i) first, an alkaline oxidizing solution comprising a permanganate and/or bromate compound or any of the corresponding salts;
  (ii) second, a neutral or alkaline reducing solution comprising a reducing agent selected from dithionite, sulphite, bisulphite, disulfite or any of the corresponding salts and/or a combination thereof; and,
  (iii) third, an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$.

By successively applying the three listed solutions in the order as indicated above, it was observed that class III rouging could be removed with an efficiency that goes beyond the application of any one or two of the three solutions separately or with a different ordering. In some preferred embodiments the method is for removing and/or preventing class III rouge formation on a stainless steel substrate. Removing class III rouging is typically a very difficult and costly process. Elimination of class III rouging is more delicate due to its different structure and chemical composition (as compared with class I and class II). Using state of art methods there is a high risk of damaging the surface state during cleaning or delivering suboptimal results by only reducing the class III rouging thickness and still leaving behind traces of rouging. However, application of the method as described herein and in particular according to the preferred embodiment may result in complete removal of class III rouging without damaging the steel substrate.

It is an aspect of the present invention to provide a kit for removing and/or preventing rouge formation on stainless steel, the kit comprising:
  (i) an alkaline oxidizing solution comprising a permanganate and/or bromate compound or any of the corresponding salts as oxidizing agent;
  (ii) a neutral or alkaline reducing solution comprising a reducing agent selected from dithionite, sulphite, bisulphite, disulfite or any of the corresponding salts and/or a combination thereof; and,
  (iii) an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$.

In some embodiments the kit is for removing and/or preventing class I rouge formation on a stainless steel substrate. In some preferred embodiments the kit is for removing and/or preventing class II rouge formation on a stainless steel substrate. In some other preferred embodiments the kit is for removing and/or preventing class III rouge formation on a stainless steel substrate. Optionally, the kit comprises instructions for performing the method according to any embodiments as described herein. Optionally, the kit comprises tools to improve the performing the method; for instance, gloves, sprays, vials, and so on. In some embodiments the kit comprises a rinsing fluid; preferably an aqueous rinsing fluid having an electrolytic conductivity of at most 1 $\mu S/cm^2$.

It is an aspect of the present invention to provide for a use of at least three solutions for removing and/or preventing rouge formation on stainless steel, the use comprising:
  (i) an alkaline oxidizing solution comprising a permanganate and/or bromate compound or any of the corresponding salts as oxidizing agent;
  (ii) a neutral or alkaline reducing solution comprising a reducing agent selected from dithionite, sulphite, bisulphite, disulfite or any of the corresponding salts and/or a combination thereof; and,
  (iii) an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$.

In some embodiments the use is for removing and/or preventing class I rouge formation on a stainless steel substrate. In some preferred embodiments the use is for removing and/or preventing class II rouge formation on a stainless steel substrate.

In some other preferred embodiments the use is for removing and/or preventing class III rouge formation on a stainless steel substrate. The use may be for systems and units typically used for the production and processing of products, such as in the pharmaceutical, food and biotechnological industries for the production and processing of products. Examples of systems and units may be mixing vats, storage containers, fermenters, recipient vessels, dryers, filling machines, sterilization vessels, freeze dryers, autoclaves, washing machines, ultrapure water generators, ultrapure vapour generators, distribution lines for purified or ultrapure fluids, and others.

The alkaline solution comprising a permanganate and/or bromate compound or any of the corresponding salts as an oxidizing agent is referred to as the alkaline oxidizing solution. This solution may produce the following effects: (i) a cleaning effect, by removing any oil, media, dry solution, and the like still present on the substrate; (ii) an oxidizing effect, by placing the metallic compounds of the rouging deposit in an oxidized state; and/or (iii) a caustic/weakening effect, by weakening the oxide layer of the rouging deposit.

In some embodiments the alkaline oxidizing solution is the first solution to contact the stainless steel substrate (i.e. the first solution is to be applied prior to any of the other solutions); this solution may be referred to as the first solution. Optionally, other solutions may be applied prior to contacting the substrate with the first solution, such as a rinsing fluid to remove any particles or chemical compounds that may be present on the steel substrate and could cause undesired chemical reactions with the first solution.

The (first) alkaline oxidizing solution may be of any alkaline pH value above 7.5. Alkaline pH may allow for stabilizing the oxidizing agent and preventing issues of oxidizing agent deposition. In some preferred embodiments the second solution has a pH of 8.0 to 14.0, preferably 10.0 to 14.0, more preferably 11.0 to 14.0, most preferably 12.0 to 14.0; for example 12.5; for example 13.0; for example 13.5. The higher alkaline pH values may more efficiently stabilise the oxidizing agent, such as $KMnO_4$, and prevent deposition from occurring, such as of $MnO_2$.

The (first) alkaline oxidizing solution comprises at least an oxidizing agent, preferably a strong oxidizing agent; an oxidizing agent is defined herein as a substance having the ability to oxidize other substances. Strong oxidizing agents typically have a high (+) oxidation state, such as +5 or +7, allowing for greater absorption of electrons. Preferably the oxidizing agent is a permanganate and/or bromate compound or any of the corresponding salts. Preferably the oxidizing agent(s) is selected from $KMnO_4$ (potassium permanganate), $NH_4MnO_4$ (Ammonium permanganate), $Ca(MnO_4)_2$ (Calcium permanganate), $NaMnO_4$ (Sodium permanganate), $AgMnO_4$ (Saver permanganate); $KBrO_3$ (Potassium Bromate) and/or a combination thereof; most preferably the oxidizing agent is $KMnO_4$, These listed oxidizing agents were observed to provide for a particularly efficient embodiment of the (first) alkaline oxidizing solution. In some embodiments the (first) alkaline oxidizing solution comprises the oxidizing agent, preferably $KMnO_4$, in a concentration of at least 0.1 g/l to at most 100.0 g/l, preferably 0.1 to 64.0 g/l (max solubility of $KMnO_4$ in water at 20° C.), more preferably 1.0 to 45.0 g/l, most preferably 5.0 g/l to 20.0 g/l. It was observed that the presence of the oxidizing agent, such as $KMnO_4$, in the preferred ranges may further improve the efficiency of the first contacting step.

The (first) alkaline oxidizing solution may comprise a base, preferably a strong base with a pKa-value of at least 13; a strong base is defined herein as having a pKa-value of at least 13. Preferably the base is NaOH (Sodium hydroxide), which has a pKa value of 13.8, and/or KOH (Potassium hydroxide), which has a pKa value of 15.7. The listed bases were observed to provide for particularly efficient embodiments of the (first) alkaline oxidizing solution. In some embodiments the (first) alkaline oxidizing solution comprises the base, preferably NaOH and/or KOH, in a concentration of at least 1.0 g/l to at most 750.0 g/l, preferably 10.0 g/l to 750.0 g/l, more preferably 25.0 g/l to 500.0 g/l, most preferably 75.0 g/l to at most 400.0 g/l. for example: 50 g/l; for example 100 g/l; for example 150 g/l; for example 250 g/l; for example 300 g/l; for example 350 g/l. It was observed that the presence of NaOH and/or KOH in the preferred ranges may further improve the efficiency of the (first) contacting step.

In some embodiments the base and the oxidizing agent are present in a concentration ratio of (1000:1) to (1:1); preferably (750:1) to (2:1); more preferably (500:1) to (5:1); most preferably (250:1) to (10:1). The listed concentration ranges were observed to provide for a particularly efficient embodiment of the (first) alkaline oxidizing solution.

In some embodiments the (first) alkaline oxidizing solution comprises NaOH and a permanganate compound, preferably $KMnO_4$, $NH_4MnO_4$, $Ca(MnO_4)_2$, $NaMnO_4$, $AgMnO_4$. In some embodiments the (first) alkaline oxidizing solution comprises KOH and a permanganate compound, preferably $KMnO_4$, $NH_4MnO_4$, $Ca(MnO_4)_2$, $NaMnO_4$, $AgMnO_4$. In some embodiments the (first) alkaline oxidizing solution comprises NaOH and a bromate compound, preferably $KBrO_3$. In some embodiments the (first) alkaline oxidizing solution comprises KOH and a bromate compound, preferably $KBrO_3$. In some preferred embodiments the (first) alkaline oxidizing solution comprises NaOH and $KMnO_4$. In some preferred embodiments the (first) alkaline oxidizing solution comprises KOH and $KMnO_4$.

In some embodiments the (first) alkaline oxidizing solution has a temperature of 70° to 100° C. during contacting with the steel substrate, preferably from 80° to 100° C., more preferably from 90° to 100° C., and most preferably from 90° to 95° C.; for example 91° C., 92° C., 93° C. or 94° C. The contacting temperature may be adjusted depending on the degree of rouging. Contacting the substrate in the preferred temperature ranges may result in improved efficiency of the (first) alkaline oxidizing solution, potentially reducing the time and the amount of (first) alkaline oxidizing solution necessary for performing the method. In some embodiments the contacting time of the stainless steel substrate with the (first) alkaline oxidizing solution is from 0.5 hours to 5.0 hours, preferably from 1.0 hour to 4.0 hours, more preferably from 1.0 hours to 3.5 hours, even more preferably from 1.0 hours to 3.0 hours, and most preferably from 1.5 hours to 2.5 hours or about 2.0 hours. The contacting time may be adjusted depending on the degree of rouging. However, applying the (first) alkaline oxidizing solution in the preferred time ranges may result in an optimal balance between efficient rouging removal and operational costs (e.g. downtime of apparatus or system affected by rouging). In a most preferred embodiment the (first) alkaline oxidizing solution contacts the steel substrate from 1.5 hours to 2.5 hours at a temperature ranging from 90° to 95° C.

The neutral or alkaline solution comprising a reducing agent selected from dithionite ($Na_2S_2O_4$), sulphite (or sulfite), bisulphite (or bisulfite), disulfite (or disulphite) and/or any of its corresponding salts is referred to as the neutral/alkaline reducing solution. The neutral/alkaline reducing solution may reduce the oxide state of the metallic compounds present in the oxide layer of the rouging deposit, such as chromium and iron, which may in turn also improve the effectiveness of the other solutions. Optionally, the solution may comprise one or more surfactants.

In some embodiments the neutral/alkaline reducing solution is the second solution is to be applied after the first alkaline oxidizing solution, but prior to the third solution (i.e. the acidic reducing solution); this solution may then be referred to as the second neutral or alkaline reducing solution. In some other embodiments the neutral/alkaline reducing solution is the third solution is to be applied after the first alkaline oxidizing solution and the second solution (i.e. the acidic reducing solution); this solution may then be referred to as the third neutral or alkaline reducing solution.

The (second/third) neutral or alkaline reducing solution may be of any neutral or alkaline pH value ranging from about 7.0 up to 14.0. Alkaline solutions may provide a more stable media for the reducing agent, thereby improving the effectiveness of the (second/third) neutral or alkaline reducing solution, but neutral solutions were observed to work as well. In some preferred embodiments the (second/third) neutral or alkaline reducing solution is an alkaline solution having a pH of 7.5 to 14.0, preferably 10.0 to 14.0, more preferably 11.0 to 14.0, most preferably 12.0 to 14.0; for example 12.5; for example 13.0; for example 13.5. The higher alkaline pH values may more efficiently stabilise the reducing agent, such as dithionite.

In some embodiments the (second solution/third) neutral or alkaline reducing solution comprises any one or a combination of the listed reducing agents in a concentration ranging from at least 1.0 g/l to at most 100.0 g/l; preferably 5.0 to 75.0 g/l; more preferably 7.5 g/l to 60.0 g/l, most preferably 10.0 g/l to 50.0 g/l; for example 10 g/l; for example 20 g/l; for example 30 g/l; for example 40 g/l. Preferably, the (second/third) neutral or alkaline reducing solution comprises dithionite in a concentration ranging from at least 1.0 g/l to at most 100.0 g/l; preferably 5.0 to 75.0 g/l; more preferably 7.5 g/l to 60.0 g/l, most preferably 10.0 g/l to 50.0 g/l. It was observed that the presence of dithionite in the preferred ranges may further improve the efficiency of the (second/third) contacting step with the neutral or alkaline reducing solution.

In some embodiments the (second/third) neutral or alkaline reducing solution comprises a strong base (i.e. a base having a pKa-value of at least 12); preferably the base is NaOH and/or KOH. Preferably the (second/third) neutral or alkaline reducing solution comprises NaOH and/or KOH in a concentration ranging from at least 1 g/l to at most 750 g/l, preferably 5 g/l to 600 g/l, more preferably 5 g/l to 500 g/l, most preferably 10 g/l to at most 400 g/l; for example: 50 g/l; for example 75 g/l; for example 100 g/l; for example 150 g/l; for example 250 g/l; for example 300 g/l; for example 350 g/l. It was observed that the presence of NaOH and/or KOH in the preferred ranges may further improve the efficiency of the other (second/third) contacting steps. In some preferred embodiments wherein the reducing agent is dithionite and wherein the base is NaOH, the dithionite concentration is at least 5 g/l and the NaOH concentration is at least 75 g/l.

In some further embodiments the base and the reducing agent are present in a concentration ratio of (1000:1) to (1:1); preferably (750:1) to (2:1); more preferably (500:1) to (5:1); most preferably (250:1) to (10:1). The listed concentration ranges were observed to provide for a particularly efficient embodiment of the (second/third) neutral or alkaline reducing solution.

In some embodiments the (second/third) neutral or alkaline reducing solution has a temperature of 80° to 100° C. during contacting with the steel substrate, preferably from 85° to 100° C., more preferably from 90° to 100° C., and most preferably from 90° to 95° C.; for example 91° C., 92° C., 93° C. or 94° C. The contacting temperature may be adjusted depending on the degree of rouging. Contacting the substrate in the preferred temperature ranges may result in improved efficiency of the (second/third) neutral or alkaline reducing solution, potentially reducing the contacting time and the amount of the (second/third) neutral or alkaline reducing solution necessary for performing the method. In some embodiments the contacting time of the stainless steel substrate with the (second/third) neutral or alkaline reducing solution is from 0.5 hours to 5.0 hours, preferably from 1.00 hour to 4.5 hours, more preferably from 1.5 hours to 4.0 hours, even more preferably from 2.0 hours to 3.5 hours, and most preferably from 2.5 to 3.5 hours or about 3.0 hours. In a most preferred embodiment the (second/third) neutral or alkaline reducing solution contacts the steel substrate from 2.5 hours to 3.5 hours at a temperature ranging from 90° to 95° C.

The acidic solution comprising complexing anions as reducing agents and ferrous iron ($Fe^{2+}$) is referred to as the acidic reducing solution. The acidic reducing solution may reduce the iron present in the rouging deposit into a preferred oxidation state and also complex it (the iron) allowing for more efficient removal; additionally it may passivate the substrate surface layer after removal of the rouging deposit. The complexing anions may be anions corresponding to the conjugate bases of organic poly-carboxilic acids. Preferably, the organic poly-carboxilic acids are selected from dicarboxylic acids and tricarboxylic acids; preferably the poly-carboxilic acids are one or more of the following: oxalic acid, citric acid, tartaric acid, maleic acid, fumaric acid, adipic acid, succinic acid, or salts thereof and/or mixtures thereof. Additionally, the one or more complexing anions may comprise oxalate. Most preferably, the acidic reducing solution comprises at least oxalic acid.

In some embodiments the acidic reducing solution is the second solution is to be applied after the first alkaline oxidizing solution, but prior to the third solution (i.e. the neutral/alkaline reducing solution); this solution may then be referred to as the second acidic reducing solution. In some alternative embodiments the alkaline oxidizing solution is the third solution is to be applied after the first solution and the second solution (i.e. the neutral/alkaline reducing solution); this solution may then be referred to as the third acidic reducing solution.

The (second/third) acidic reducing solution may be of any acidic pH value below 6.5. Acidic pH may allow for optimal effectiveness of the complexing anions present in the third) acidic reducing solution. In some embodiments the (second/third) acidic reducing solution has a pH from 0 to 6.0, preferably from 1.0 to 5.0, more preferably from 1.0 to 4.0, even more preferably from 2.0 to 4.0, most preferably from 2.5 to 3.5, even more preferably 2.8 to 3.2, even more preferably from 2.8 to 3.0; for example 2.9. Optionally, the (second/third) acidic reducing solution may comprise one or more pH modifiers. Preferably said one or more pH modifiers are one or more acids, preferably the one or more acids are $NH_3$ and/or $NH_4OH$. A more acidic pH may further improve the effectiveness of the (second/third) contacting step with the acidic reducing solution and the preferred pH ranges were observed to provide the most optimal results.

In some embodiments the (second/third) acidic reducing solution comprises $1.0\times10^{-2}$ to $5\times10^{-2}$ mol/l of one or more complexing anions, preferably about $2.0\times10^{-2}$ mol/l. It was observed that the presence of one or more complexing anions in the preferred ranges may further improve the efficiency of the method. In some embodiments the (second/third) acidic reducing solution comprises from $1.35\times10^{-5}$ to $9.0\times10^{-5}$ mol/l of $Fe^{2+}$, preferably about $5.0\times10^{-5}$ mol/l. It was observed that the presence of $Fe^{2+}$ in the preferred ranges may further improve the efficiency of the method.

In some embodiments the (second/third) acidic reducing solution has a temperature of 50° to 100° C. during contacting with the steel substrate, preferably of 60 to 90° C., more preferably of 70 to 90° C., and most preferably from 80 to 90° C.; for example 83° C.; for example 85° C.; for example 87° C. The contacting temperature may be adjusted depending on the degree of rouging. Contacting the substrate in the preferred temperature ranges may result in improved efficiency of the (second/third) acidic reducing solution, potentially reducing the time and the amount of (second/third) acidic reducing solution necessary for performing the method. In some embodiments the contacting time of the stainless steel substrate with the (second/third) acidic reducing solution is from 0.50 hours to 8 hours, preferably from 0.50 hour to 4 hours, more preferably from 0.50 hours to 2 hours, most preferably from 0.75 hours to 1.5 hours. In a most preferred embodiment the (second/third) acidic reducing solution contacts the steel substrate from 0.75 hours to 1.5 hours at a temperature ranging from 80° to 90° C. The contacting time may be adjusted depending on the degree of rouging. However, applying the (second/third) acidic reducing solution in the preferred time ranges may result in an optimal balance between efficient rouging removal and operational costs (e.g. downtime of the apparatus or system affected with rouging).

In a preferred embodiment the method comprises the steps of contacting a stainless steel substrate with the following solutions:
(i) first, an alkaline oxidizing solution comprising a permanganate and/or bromate compound or any of the corresponding salts as an oxidizing agent;
(ii) second, one of the following solutions:
  a neutral or alkaline reducing solution comprising dithionite, sulphite, bisulphite, disulfite or any of the corresponding salts and/or a combination thereof as a reducing agent, or
  an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$; and,
(iii) third, the neutral or alkaline reducing solution or the acidic reducing solution not used in the (ii) second step.

In an alternative preferred embodiment the method comprises the steps of successively contacting a stainless steel substrate with the following solutions:
(i) first, an alkaline oxidizing solution comprising a permanganate and/or bromate compound or any of the corresponding salts as an oxidizing agent;
(ii) second, an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$; and,
(iii) third, a neutral or alkaline reducing solution comprising dithionite, sulphite, bisulphite, disulfite or any of the corresponding salts and/or a combination thereof as a reducing agent. Preferably, this method is for removing and/or preventing class II rouge formation on a stainless steel substrate.

In an alternative preferred embodiment the method comprises the steps of successively contacting a stainless steel substrate with the following solutions:
(i) first, an alkaline oxidizing solution comprising a permanganate and/or bromate compound or any of the corresponding salts as an oxidizing agent;
(ii) second, a neutral or alkaline reducing solution comprising dithionite, sulphite, bisulphite, disulfite or any of the corresponding salts and/or a combination thereof as a reducing agent; and,
(iii) third, an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$.

Preferably, this method is for removing and/or preventing class III rouge formation on a stainless steel substrate.

In a preferred embodiment, the method, kit and/or use comprise the following solutions: (i) an alkaline oxidizing solution comprising a base with a pKa-value of at least 13 and a permanganate and/or a bromate compound as oxidizing agent; (ii) a alkaline reducing solution comprising a base with a pKa-value of at least 13, and a reducing agent selected from dithionite, sulphite, bisulphite, disulfite or any of the corresponding salts and/or a combination thereof; and, (iii) an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$.

In a preferred embodiment, the method, kit and/or use comprise the following solutions: (i) an alkaline oxidizing solution comprising a permanganate and/or a bromate compound as oxidizing agent, and NaOH and/or KOH; (ii) an alkaline reducing solution comprising selected from dithionite, sulphite, bisulphite, disulfite or any of the corresponding salts and/or a combination thereof as a reducing agent, and NaOH and/or KOH; and, (iii) an acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$.

In an exemplary embodiment, the method, kit and/or use comprise the following solutions: (i) an alkaline oxidizing solution comprising NaOH and $KMnO_4$; (ii) a alkaline reducing solution comprising NaOH and dithionite; and, (iii) a acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$. In another exemplary embodiment, the method, kit and/or use comprise the following solutions: (i) an alkaline oxidizing solution comprising KOH and $NH_4MnO_4$; (ii) a alkaline reducing solution comprising NaOH and sulphite; and, (iii) a acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$. In yet another exemplary embodiment, the method, kit and/or use comprise the following solutions: (i) an alkaline oxidizing solution comprising NaOH and $NaMnO_4$; (ii) a alkaline reducing solution comprising KOH and disulfite; and, (iii) a acidic reducing solution comprising at least $5.0 \times 10^{-3}$ to at most $1.0 \times 10^{-1}$ mol/l of complexing anions and at least $1.35 \times 10^{-5}$ to at most $9.0 \times 10^{-5}$ mol/l of $Fe^{2+}$.

EXAMPLES

Example 1

Reference is made to FIG. 1. The figure shows three cut-out stainless steel substrates (100) before and after treatment. The first stainless steel substrate (A) shows a significant class III rouging deposit, the second stainless steel substrate (B) shows a slightly reduced class III rouging deposit resulting from a suboptimal treatment, whereas the third stainless steel substrate (C) shows a complete removal of class III rouging resulting from a treatment performed according to the method as described herein by successive contacting with three solutions, namely, (i) firstly with an alkaline oxidizing solution comprising potassium permanganate, (ii) secondly with an alkaline reducing solution comprising dithionite, and (iii) thirdly with an acidic reducing solution comprising complexing anions and $Fe^{2+}$.

Example 2

In a second example, various concentrations and thermodynamic conditions (e.g. contacting temperature and time) were tested across a total of seven experiments to determine the rouging removal efficiency of the herein described solutions on samples prepared from steel substrates showing a significant class III rouging deposit (thickness between 200 nm and 1000 nm). Additionally, the samples may also show some class II class rouging deposits.

Every one of the seven samples was successively contacted with three solutions, namely, (i) firstly with an alkaline oxidizing solution comprising potassium permanganate, (ii) secondly with an alkaline reducing solution comprising dithionite, and (iii) thirdly with an acidic reducing solution comprising complexing anions and $Fe^{2+}$. Between every contacting step, the leftover solution was drained from the substrate and the substrate surface was rinsed with an aqueous rinsing fluid having an electrolytic conductivity below 1 µS/cm². For the sake of simplicity the draining and rinsing steps are only recited in the first test, but they may be assumed to have also been performed in the other six tests (i.e. tests two to seven).

In a first test a steel substrate is covered with a first solution comprising 100 g/l NaOH and 5 g/l $KMnO_4$ for 2 hours at a temperature between 90 to 95° C. The first solution is drained and the steel substrate is rinsed with a rinsing fluid. Then the substrate is contacted with a second solution comprising 10 g/l NaOH and 5 g/l dithionite for 3 hours at a temperature between 90 to 95° C. After draining of the second solution and rinsing of the substrate, the steel substrate is treated with a third solution comprising $2.0\times10^{-2}$ mol/l of complexing anions and $5.0\times10^{-5}$ mol/l of $Fe^{2+}$. At the end of the treatment the steel substrate (surface) of the second test still shows some rouging deposits.

In a second test a steel substrate is covered with a first solution comprising 100 g/l NaOH and 5 g/l $KMnO_4$ for 2 hours at a temperature between 90 to 95° C. Next, the steel substrate is contacted with a second solution comprising 30 g/l NaOH and 5 g/l dithionite for 3 hours at a temperature between 90 to 95° C. Finally, the steel substrate is treated with a third solution comprising $2.0\times10^{-2}$ mol/l of complexing anions and $5.0\times10^{-5}$ mol/l of $Fe^{2+}$. At the end of the treatment the steel substrate (surface) of the second test still shows some rouging deposits.

In a third test a steel substrate is covered with a first solution comprising 10 g/l NaOH and 1 g/l $KMnO_4$ for 2 hours at a temperature between 90 to 95° C. Next, the steel substrate is contacted with a second solution comprising 10 g/l NaOH and 5 g/l dithionite for 3 hours at a temperature between 90 to 95° C. Afterwards the steel substrate is treated with a third solution comprising $2.0\times10^{-2}$ mol/l of complexing anions and $5.0\times10^{-5}$ mol/l of $Fe^{2+}$. At the end of the treatment the steel substrate (surface) of the second test still shows some rouging deposits.

In a fourth test a steel substrate is covered with a first solution comprising 100 g/l NaOH and 5 g/l $KMnO_4$ for 2 hours at a temperature between 90 to 95° C. Next, the steel substrate is contacted with a second solution comprising 75 g/l NaOH and 50 g/l dithionite for 3 hours at a temperature between 90 to 95° C. Afterwards the steel substrate is treated with a third solution comprising $2.0\times10^{-2}$ mol/l of complexing anions and $5.0\times10^{-5}$ mol/l of $Fe^{2+}$. As a result of the treatment all rouging deposits have been completely removed from the steel substrate (surface) of the fourth test.

In a fifth test a steel substrate is covered with a first solution comprising 100 g/l NaOH and 5 g/l $KMnO_4$ for 2 hours at a temperature between 90 to 95° C. Next, the steel substrate is contacted with a second solution comprising 75 g/l NaOH and 5 g/l dithionite for 3 hours at a temperature between 90 to 95° C. Afterwards the steel substrate is treated with a third solution comprising $2.0\times10^{-2}$ mol/l of complexing anions and $5.0\times10^{-5}$ mol/l of $Fe^{2+}$. As a result of the treatment all rouging deposits have been completely removed from the steel substrate (surface) of the fifth test.

In a sixth test a steel substrate is covered with a first solution comprising 10 g/l NaOH and 1 g/l $KMnO_4$ for 2 hours at a temperature between 90 to 95° C. Next, the steel substrate is contacted with a second solution comprising 75 g/l NaOH and 5 g/l dithionite for 3 hours at a temperature between 90 to 95° C. Afterwards the steel substrate is treated with a third solution compris-ing $2.0\times10^{-2}$ mol/l of complexing anions and $5.0\times10^{-5}$ mol/l of $Fe^{2+}$. As a result of the treatment all rouging deposits have been completely removed from the steel substrate (surface) of the sixth test.

In an seventh test a steel substrate is covered with a first solution comprising 10 g/l NaOH and 1 g/l $KMnO_4$ for 2 hours at a temperature between 85 to 90° C. Next, the steel substrate is contacted with a second solution comprising 75 g/l NaOH and 5 g/l dithionite for 3 hours at a temperature between 90 to 95° C. Afterwards the steel substrate is treated with a third solution comprising $2.0\times10^{-2}$ mol/l of complexing anions and $5.0\times10^{-5}$ mol/l of $Fe^{2+}$. As a result of the treatment all rouging deposits have been completely removed from the steel substrate (surface) of the seventh test.

To conclude, it could be observed that a method of successively applying at least three solutions in accordance with the concentrations and thermodynamic conditions (e.g. contacting time and temperature) of tests four to seven resulted in a complete removal of all rouging deposits from the stainless steel substrate, specifically of the class III rouging deposits. It is noted that these tests represent preferred embodiments of the present method and should therefore not be regarded as limitative to the scope of protection. Although the treatments having concentrations and/or thermodynamic conditions deviating from the preferred embodiments (i.e. tests one to three) showed a reduced degree of total rouging removal from the stainless steel substrates, some reduction of rouging deposits could still be observed, such as of class II rouging.

Example 3

Figures 2A, 2B:
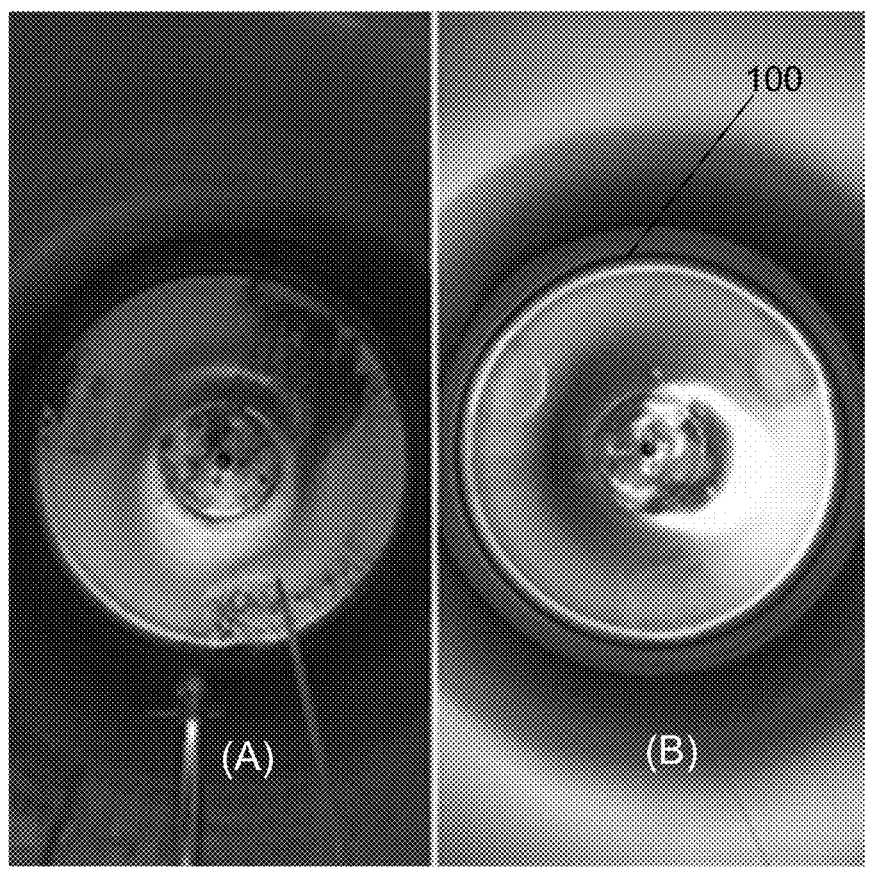
FIG. 2A-2B shows two cut-out stainless steel substrates (100) before and after a treatment. (A) The first stainless steel substrate shows a significant class II rouging deposit. (B) The second stainless steel substrate shows a complete removal of class II rouging resulting from a treatment performed according to the method as described herein by successive contacting with three solutions, namely, (i) firstly with an alkaline oxidizing solution comprising potassium permanganate, (ii) secondly with an acidic reducing solution comprising complexing anions and $Fe^{2+}$, and (iii) thirdly with an alkaline reducing solution comprising dithionite.

Reference is made to FIG. 2. The figure shows two cut-out stainless steel substrates (100) before and after a treatment. The first stainless steel substrate (A) shows a significant class II rouging deposit, whereas the second stainless steel substrate (B) shows a complete removal of class II rouging resulting from a treatment performed according to the method as described herein by successive contacting with three solutions, namely, (i) firstly with an alkaline oxidizing solution comprising potassium permanganate, (ii) secondly with an acidic reducing solution comprising complexing anions and $Fe^{2+}$, and (iii) thirdly with an alkaline reducing solution comprising dithionite.

Furthermore, the same concentrations and thermodynamic conditions (e.g. contacting temperature and time) listed in Example 2 were tested on samples prepared from steel substrates showing a significant class II rouging deposit. Every sample was successively contacted in a similar fashion with three solutions, namely: (i) first with an alkaline oxidizing solution comprising potassium permanganate, (ii) second with an acidic reducing solution comprising complexing anions and $Fe^{2+}$, and (iii) third with an alkaline reducing solution comprising dithionite. Between each contacting step, the leftover solution was drained from the substrate and the substrate surface was rinsed with an aqueous rinsing fluid having an electrolytic conductivity below 1 µS/cm².

To summarize the observed results, it was found that method of successively applying at least three solutions in accordance with the concentrations and thermodynamic conditions (e.g. contacting time and temperature) of tests four to seven of Example 2 resulted in a complete removal of all rouging deposits from the stainless steel substrate, specifically of the class II rouging deposits. It is noted that these tests represent preferred embodiments of the present method and should therefore not be regarded as limitative to the scope of protection.

The invention claimed is:

1. A method for removing rouge formation on stainless steel, the method comprising the steps of separately contacting a stainless steel substrate having rouging with each of the following solutions:
   an alkaline oxidizing solution comprising permanganate and/or bromate compound, or any of the corresponding salts as an oxidizing agent;
   a neutral or alkaline reducing solution comprising dithionite, sulphite, bisulphite, disulfite, any of the corresponding salts and/or a combination thereof as a reducing agent;
   and,
   an acidic reducing solution comprising at least $5.0\times10^{-3}$ to at most $1.0\times10^{-1}$ mol/l of complexing anions and at least $1.35\times10^{-5}$ to at most $9.0\times10-5$ mol/l of $Fe^{2+}$;
   wherein the method comprises contacting the stainless steel substrate with the solutions in the following order:
   first with said alkaline oxidizing solution, second with said neutral or alkaline reducing solution, and third with said acidic reducing solution, or
   first with said alkaline oxidizing solution, second with said acidic reducing solution, and third with said neutral or alkaline reducing solution,
   thereby removing rouging from said stainless steel substrate.

2. The method of claim 1, wherein the method comprises the steps of successively contacting a stainless steel substrate with the following solutions:
   (i) first, an alkaline oxidizing solution comprising a permanganate and/or bromate compound or any of the corresponding salts as an oxidizing agent;
   (ii) second, a neutral or alkaline reducing solution comprising dithionite, sulphite, bisulphite, disulfite or any of the corresponding salts and/or a combination thereof as a reducing agent; and,
   (iii) third, an acidic reducing solution comprising at least $5.0\times10^{-3}$ to at most $1.0\times10^{-1}$ mol/l of complexing anions and at least $1.35\times10^{-5}$ to at most $9.0\times10-5$ mol/l of $Fe^{2+}$.

3. The method of claim 1, wherein the method comprises the steps of successively contacting a stainless steel substrate with the following solutions:
   (i) first, an alkaline oxidizing solution comprising a permanganate and/or bromate compound or any of the corresponding salts as an oxidizing agent;
   (ii) second, an acidic reducing solution comprising at least $5.0\times10^{-3}$ to at most $1.0\times10^{-1}$ mol/l of complexing anions and at least $1.35\times10^{-5}$ to at most $9.0\times10^{-5}$ mol/l of $Fe^{2+}$; and,
   (iii) third, a neutral or alkaline reducing solution comprising dithionite, sulphite, bisulphite, disulfite or any of the corresponding salts and/or a combination thereof as a reducing agent.

4. The method of claim 1, wherein the oxidizing agent(s) in the alkaline oxidizing solution is selected from $KMnO_4$, $NH_4MnO_4$, $Ca(Mn_4)_2$, $NaMnO_4$, $AgMnO_4$, $KBrO_3$ and a combination thereof.

5. The method of claim 1, wherein the oxidizing agent(s) in the alkaline oxidizing solution is present in a concentration of at least 0.1 g/l to at most 100.0 g/l.

6. The method of claim 1, wherein the alkaline oxidizing solution has a pH of 7.5 to 14.0.

7. The method of claim 1, wherein the alkaline oxidizing solution comprises NaOH and/or KOH as a base present in a concentration of at least 1.0 g/l to at most 750.0 g/l.

8. The method of claim 1, wherein the alkaline oxidizing solution has a temperature of 80° to 120° C. during contacting with the steel substrate.

9. The method of claim 1, wherein the contacting time of the alkaline oxidizing solution with the stainless steel substrate is from 0.5 to 5.0 hours.

10. The method of claim 1, wherein the neutral or alkaline reducing solution comprises the reducing agent in a concentration ranging from at least 1.0 g/l to at most 100.0 g/l.

11. The method of claim 1, wherein the neutral or alkaline reducing solution is an alkaline solution having a pH of 7.5 to 14.0.

12. The method of claim 11, wherein the alkaline reducing solution comprises NaOH and/or KOH as base in a concentration of at least 1.0 g/l to at most 750.0 g/l.

13. The method of claim 1, wherein the neutral or alkaline reducing solution has a temperature of 80° to 120° C. during contacting with the steel substrate.

14. The method of claim 1, wherein the contacting time of the neutral or alkaline reducing solution with the stainless steel substrate is from 0.5 to 5.0 hours.

15. The method of claim 1, wherein the complexing anions in the acidic reducing solution are anions corresponding to conjugate bases of organic polycarboxilic acids.

16. The method of claim 15, wherein the poly-carboxylic acids are one or more of the following: oxalic acid, citric acid, tartaric acid, maleic acid, fumaric acid, adipic acid, succinic acid, and mixtures thereof.

17. The method of claim 1, wherein the acidic reducing solution comprises the one or more complexing anions in a concentration from $1.0\times10^{-2}$ to $5\times10^{-2}$ mol/l.

18. The method of claim 1, wherein the acidic reducing solution comprises the $Fe^{2+}$ in a concentration of $5.0\times10^{-5}$ mol/l.

19. The method of claim 1, wherein the acidic reducing solution has a pH from 1.0 to 5.0.

20. The method of claim 1, wherein the acidic reducing solution comprises one or more pH modifiers.

21. The method of claim 1, wherein the acidic reducing solution has a temperature of 50° to 100° C. during contacting with the steel substrate.

22. The method of claim 1, wherein the contacting time of the acidic reducing solution with the stainless steel substrate is from 0.50 hours to 8 hours.

23. The method of claim 1, wherein when performing the contacting steps, a first rinse with rinsing fluid is performed between first and second contacting steps, and a second rinse with rinsing fluid is performed between the second contacting step and a third contacting step.

24. The method of claim 23, for removing class II and/or class III rouge formation on a stainless steel substrate.

* * * * *